United States Patent
Kim

(10) Patent No.: US 11,342,569 B2
(45) Date of Patent: May 24, 2022

(54) HUMIDIFIER FOR FUEL CELL

(71) Applicants: Hyundai Motor Company, Seoul (KR); Kia Motors Corporation, Seoul (KR)

(72) Inventor: Jong Sung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 637 days.

(21) Appl. No.: 16/410,443

(22) Filed: May 13, 2019

(65) Prior Publication Data
US 2020/0185738 A1 Jun. 11, 2020

(30) Foreign Application Priority Data
Dec. 7, 2018 (KR) .................. 10-2018-0157535

(51) Int. Cl.
*H01M 8/04119* (2016.01)
(52) U.S. Cl.
CPC ... *H01M 8/04141* (2013.01); *H01M 8/04149* (2013.01)
(58) Field of Classification Search
CPC ............... H01M 8/04141; H01M 8/04149
USPC ..................... 261/64.3, 102, 105
See application file for complete search history.

(56) References Cited

U.S. PATENT DOCUMENTS

| 10,026,976 | B2 * | 7/2018 | Noh | H01M 8/04149 |
| 2008/0093752 | A1 | 4/2008 | Jean | |
| 2014/0162150 | A1 | 6/2014 | Kim et al. | |
| 2015/0364779 | A1 | 12/2015 | Noh et al. | |
| 2019/0326618 | A1 * | 10/2019 | Oh | H01M 8/04141 |
| 2020/0266464 | A1 * | 8/2020 | Kim | H01M 8/04149 |
| 2021/0050607 | A1 * | 2/2021 | Kim | H01M 8/2484 |

FOREIGN PATENT DOCUMENTS

KR 10-2016-0073524 6/2016

\* cited by examiner

*Primary Examiner* — Charles S Bushey
(74) *Attorney, Agent, or Firm* — Mintz Levin Cohn Ferris Glovsky and Popeo, P.C.; Peter F. Corless

(57) ABSTRACT

A humidifier for a fuel cell is provided. The humidifier includes a membrane having a humidifying membrane, a first cap coupled to a first side of the membrane to feed supply air into the humidifying membrane, and a second cap coupled to a second side of the membrane to release humidified supply air. An exhaust air inlet is coupled to the second side of the membrane to inject exhaust air from a fuel cell stack into the membrane, and an exhaust air outlet coupled to the first side of the membrane to release dehumidified exhaust air to an exhaust line. The first cap includes a supply air inflow passage and a variable member that has at least a portion capable of entering the supply air inflow passage. The variable member is moved in an inward direction or in an outward direction based on pressure inside the supply air inflow passage.

12 Claims, 6 Drawing Sheets

A-A'

HUMIDIFIER FOR FUEL CELL

CROSS-REFERENCE TO RELATED APPLICATION

This application is claims the benefit of priority to Korean Patent Application No. 10-2018-0157535, filed on Dec. 7, 2018, the entire contents of which are incorporated herein by reference.

TECHNICAL FIELD

The present disclosure relates to a humidifier for a fuel cell, and more particularly, to a humidifier that actively adjusts the amount of added moisture based on various operating conditions of a fuel cell stack.

BACKGROUND

Fuel cell systems, which continually produce electrical energy through an electro-chemical reaction of fuel continuously supplied thereto, have been studied and developed as an alternative for solving global environmental problems. The fuel cell systems may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), and a direct methanol fuel cell (DMFC) based on the types of electrolytes used. The fuel cell systems may be applied to various applications, such as mobile power supply, transportation, distributed power generation, and the like, based on operating temperatures and output ranges along with the types of fuels used.

Among the fuel cells mentioned above, the PEMFC is applied to a hydrogen vehicle (a hydrogen fueled cell vehicle) that is being developed to replace an internal combustion engine. The hydrogen vehicle is driven by producing electricity through an electro-chemical reaction of hydrogen and oxygen and operating a motor with the electricity produced. Accordingly, the hydrogen vehicle includes a hydrogen ($H_2$) tank for storing hydrogen ($H_2$), a fuel cell stack (FC stack) that produces electricity through oxidation/reduction reactions of hydrogen ($H_2$) and oxygen ($O_2$), various apparatuses for draining water produced, a battery configured to store the electricity produced by the fuel cell stack, a controller configured to convert and adjust the electricity produced, a motor configured to generate a driving force, and the like.

The fuel cell stack refers to a fuel cell body having tens or hundreds of cells stacked in series. The fuel cell stack has a structure in which a plurality of cells are stacked between end plates, each cell including an electrolyte membrane that divides the interior of the cell into two parts, an anode on a first side of the electrolyte membrane, and a cathode on a second side thereof. A separator is disposed between the cells to restrict flow paths of hydrogen and oxygen. The separator is made of a conductor to move electrons during oxidation/reduction reactions.

When hydrogen is supplied to the anode, the hydrogen is divided into hydrogen ions and electrons by a catalyst. The electrons produce electricity while moving outside the fuel cell stack through the separator. The hydrogen ions pass through the electrolyte membrane and move to the cathode, after which the hydrogen ions are combined with oxygen supplied from ambient air and electrons to produce water, and the water produced is discharged to the outside.

While the fuel cell stack is in operation, some other components supplied from the ambient air may also move when the hydrogen ions move through the electrolyte membrane. In other words, since the atmosphere contains about 21% oxygen and about 78% nitrogen, air introduced from the outside contains more nitrogen than oxygen. Nitrogen moving from the cathode through the electrolyte membrane to the anode may remain in the anode to decrease the concentration of hydrogen. The hydrogen concentration below a predetermined level in the anode may cause degradation in durability as well as performance.

Accordingly, exhaust lines are connected to the anodes in the stack to discharge gas in the anodes to the outside every predetermined period of time by opening and closing a purge valve. However, the purge gas discharged from the anodes contains hydrogen with a considerable concentration (in general, a level of about 60% to 70%). The discharged hydrogen may cause deterioration in the efficiency of the fuel cell system according to a reduction in hydrogen utilization rate.

The PEMFC may maintain power generation efficiency only if an appropriate moisture content is maintained by supplying a predetermined amount of moisture to a polymer electrolyte membrane of a membrane-electrode assembly (MEA). Additionally, a fuel cell system of the related art may include a humidifier configured to humidify inflow gas flowing into a fuel cell stack. The humidifier is required to adjust the amount of added moisture based on the humidity inside the fuel cell stack since even when the inside of the fuel cell stack is very humid, the diffusion of the inflow gas may be reduced, and therefore the power generation efficiency may be decreased. Accordingly, a fuel cell system in the related art is configured such that part of inflow gas is directly introduced into a fuel cell stack via a bypass passage except through a humidifier and the rest of the inflow gas is humidified. However, in this case, the overall system is complex.

SUMMARY

The present disclosure provides a fuel cell humidifier configured to actively adjust the amount of added moisture based on various operating conditions of a fuel cell stack. The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a humidifier for a fuel cell may include a membrane part having a humidifying membrane accommodated therein, a first cap coupled to a first side of the membrane part to feed supply air into the humidifying membrane, a second cap coupled to a second side of the membrane part, which is opposite to the first side of the membrane part, to release humidified supply air introduced from the humidifying membrane, an exhaust air inlet coupled to one of the first and second sides of the membrane part to inject exhaust air released from a fuel cell stack into the membrane part, and an exhaust air outlet coupled to one of the first and second sides of the membrane part, that is the opposite side to which the exhaust air inlet coupled, and configured to release dehumidified exhaust air passing through the membrane part to an exhaust line.

The first cap may include a supply air inflow passage through which the supply air to be fed into the humidifying membrane flows and a variable member that is installed in the supply air inflow passage or that has at least a portion that is capable of entering the supply air inflow passage. The variable member may be moved in an inward direction toward the center of the supply air inflow passage or in an outward direction opposite to the inward direction based on pressure inside the supply air inflow passage to vary a cross-sectional area of at least a portion of the supply air inflow passage.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
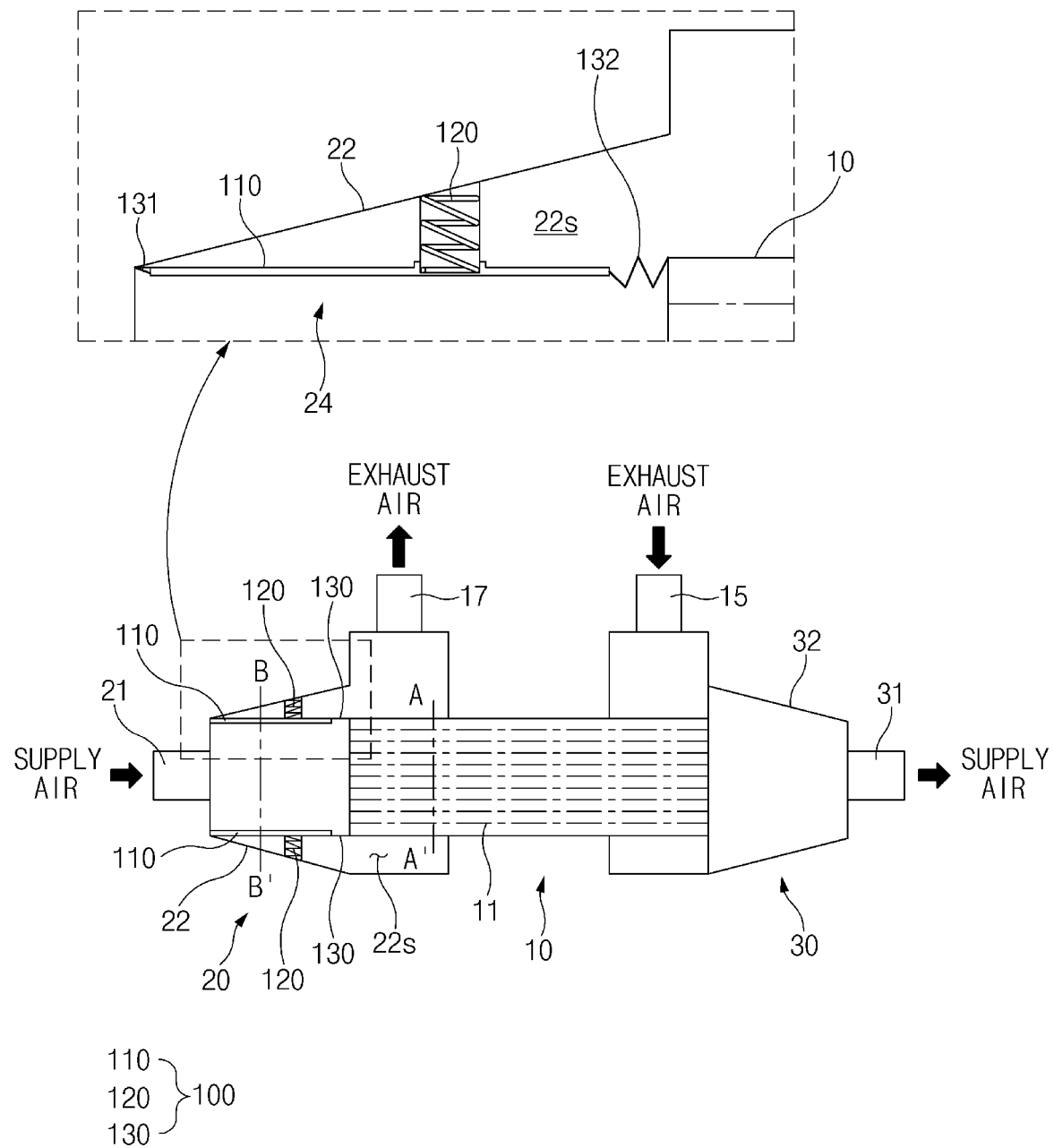
FIG. 1 is a schematic view illustrating a humidifier for a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, embodiments of the present disclosure will be described in detail with reference to the accompanying drawings It should be understood that even if shown in different drawings, identical components are provided with identical reference numerals in the drawings. Furthermore, in describing the exemplary embodiments of the present disclosure, detailed descriptions related to well-known functions or configurations will be omitted when they may make subject matters of the present disclosure unnecessarily obscure.

Terms, such as "first", "second", "A", "B", "(a)", "(b)", and the like, may be used herein to describe components of the present disclosure. Such terms are only used to distinguish one component from another component, and the substance, sequence, order, or number of these components is not limited by these terms. If a component were described as "connected", "coupled", or "linked" to another component, they may mean the components are not only directly "connected", "coupled", or "linked" but also are indirectly "connected", "coupled", or "linked" via a third component.

Figure 2A:
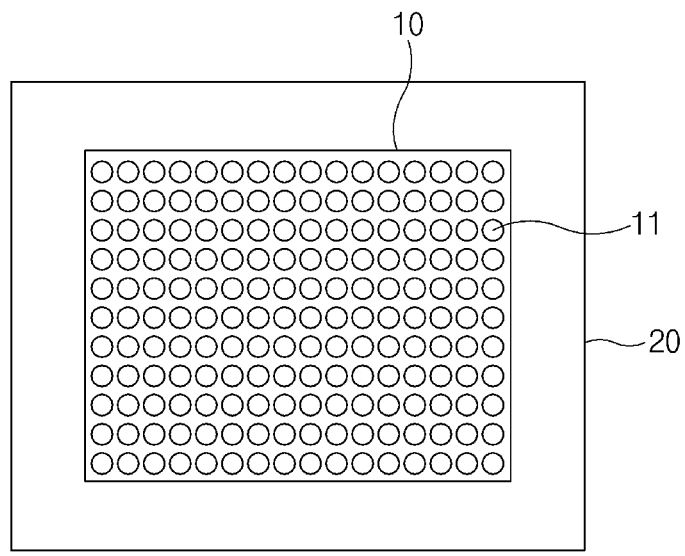
FIG. 2A is a sectional view taken along line A-A' of FIG. 1 according to an exemplary embodiment of the present disclosure.
Figure 2B:
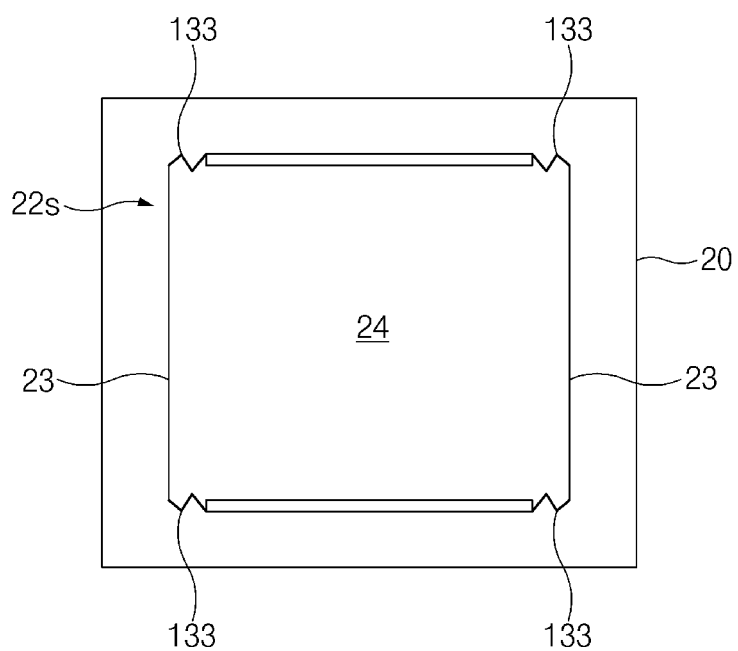
FIG. 2B is a sectional view taken along line B-B' of FIG. 1 according to an exemplary embodiment of the present disclosure.

FIG. 1 is a schematic view illustrating a humidifier for a fuel cell according to an exemplary embodiment of the present disclosure. FIG. 2A is a sectional view taken along line A-A' of FIG. 1, and FIG. 2B is a sectional view taken along line B-B' of FIG. 1.

The fuel cell humidifier according to the exemplary embodiment of the present disclosure may be applied to a fuel cell system configured to produce electrical energy through an electro-chemical reaction of hydrogen fuel with air that is an oxidizing agent. For example, the fuel cell system may be employed in a fuel cell vehicle to operate an electric motor and drive the vehicle. The fuel cell humidifier according to the exemplary embodiment of the present disclosure may be configured to execute membrane humidification on exhaust air released from a fuel cell stack and supply air supplied from an air compressor and may be configured to supply the humidified air into the fuel cell stack.

The fuel cell humidifier may include a membrane part 10, a first cap 20, and a second cap 30. The membrane part 10, also referred to as "shell-in" in the art, may include humidifying membranes 11 concentrated therein, which are bundles of hollow fiber membranes. For example, the humidifying membranes 11 may be accommodated within a cylindrical housing. The membrane part 10 may include support members (also referred to as "potting parts" in the art) that support opposite ends of the humidifying membranes 11. For example, the support members may be made of a polymer and may be fixed to opposite ends of the housing to support the opposite ends of the humidifying membranes 11. The membrane part 10 may include an exhaust air inlet 15 for injecting exhaust air released from the fuel cell stack into the housing and an exhaust air outlet 17 for releasing dehumidified exhaust air to an exhaust line.

Referring to FIG. 1, in this exemplary embodiment, the exhaust air inlet 15 and the exhaust air outlet 17 may be formed at the top of the membrane part 10. Without being limited thereto, however, the exhaust air inlet 15 and the exhaust air outlet 17 may be formed at the top and the bottom of the membrane part 10, respectively. The first cap 20, also referred to as "cap-in" in the art, may be configured to inject supply air supplied through the air compressor into the membrane part 10. The first cap 20 may be coupled to a first longitudinal end of the membrane part 10. The first cap 20 may include a supply air inlet 21 for supplying the supply air into the membrane part 10. The second cap 30, also referred to as "cap-out" in the art, may be configured to release humidified air introduced from the membrane part 10, to the fuel cell stack. The second cap 30 may be coupled to a second longitudinal end of the membrane part 10. The second cap 30 may include a humidified-air outlet 31 for releasing the humidified air to the fuel cell stack.

A humidifier for a fuel cell in the related art is fixed in a specific shape and therefore has difficulty in actively adjusting the amount of added moisture based on operating conditions of a fuel cell system. Accordingly, when the fuel cell system is in a high power output condition, a fuel cell stack is not sufficiently humidified and becomes dry and thus, high membrane resistance causes performance degradation. When the fuel cell system is in a low power output condition, the fuel cell stack is excessively humidified and thus, flooding in the fuel cell blocks an inflow of air, causing performance degradation.

The present disclosure relates to a humidifier for a fuel cell that actively adjusts the humidifying performance based on operating conditions of a fuel cell system. More specifically, the fuel cell humidifier according to this exemplary embodiment may include a variable member 100 configured to move in an inward direction toward the center of a supply air inflow passage, through which supply air to be supplied into the humidifying membranes 11 may flow, or in an outward direction opposite to the inward direction based on the pressure inside the supply air inflow passage to vary the cross-sectional area of at least a portion of the supply air inflow passage, thereby actively adjusting the humidifying performance based on operating conditions of the fuel cell system.

In the following description, the humidifying performance of the humidifier should be construed as meaning the humidifying performance varying based on operating conditions of the humidifier rather than the maximum humidifying performance according to characteristics of the humidifier itself. Features of the fuel cell humidifier according to this exemplary embodiment will be described below in more detail.

Particularly, the first cap 20 may include a first cap housing 22. The first cap housing 22 may include an inner space 22s and may connect to the exhaust air outlet 17 such that exhaust air may flow into the inner space 22s of the first cap housing 22. Additionally, the first cap 20 may include a supply air inflow passage 24 therein, through which supply air to be supplied into the humidifying membranes 11 may flow. The first cap 20 may include the variable member 100 installed in the supply air inflow passage 24 or having at least a portion that is capable of entering the supply air inflow passage 24. In other words, a portion of the variable member may include a portion that is capable of entering the supply air inflow passage 24.

The supply air inflow passage 24 and the variable member 100 may be disposed in the inner space 22s of the first cap housing 22. The inner space 22s of the first cap housing 22 may become gradually wider from a first side of the first cap housing 22, through which the supply air flows into the first cap housing 22, to a second side (e.g., an opposite side from the first side) of the first cap housing 22 coupled to the membrane part 10 and may allow plates 110 to rotate in the outward direction by a predetermined angle.

The supply air inlet 21, through which the supply air flows into the first cap housing 22, may be formed at the first side of the first cap housing 22. The cross-sectional area of the supply air inflow passage 24 may be greater than the cross-sectional area of the supply air inlet 21 and thus, the pressure of the supply air may increase when the supply air flows into the supply air inflow passage 24. The variable member 100 may include the plates 110, elastic members 120, and connecting members 130.

Particularly, the plates 110 may have a first end connected to the first side of the first cap housing 22 and a second end (e.g., an opposite end to the first end) that extends toward the entrance of the membrane part 10. The plates 110 may include first and second plates 110. The first and second plates 110 may be connected to a first side and a second side of a pair of fixed passage walls 23. In the inner space 22s of the first cap housing 22, the pair of fixed passage walls 23 may be fixed to face each other, and the first and second plates 110 may be connected to the first side and the second side of the pair of fixed passage walls 23 to face each other. Accordingly, the pair of fixed passage walls 23 and the first and second plates 110 may form the supply air inflow passage 24 together.

The first end of each plate 110 may be coupled to the first side of the first cap housing 22 by a first connecting member 131. In other words, the plate 110 may be installed to rotate about a predetermined axis of rotation in a restrictive sense. Alternatively, the central axis of rotation of the plate 110 may vary somewhat, but the plate 110 may appear to rotate about the axis thereof as a whole. The second end of the plate 110 may be connected to the first longitudinal end of the membrane part 10 by a second connecting member 132. However, the plate 110 does not necessarily have to be connected to the first longitudinal end of the membrane part 10. The plate 110 may be connected to a fixed passage wall connected to the first longitudinal end of the membrane part 10, among the fixed passage walls 23 that form the supply air inflow passage 24.

The elastic members 120 may be installed in the inner space 22s of the first cap housing 22 to elastically support the plates 110. Each of the elastic members 120 may be fixed to the first cap housing 22 at a first end thereof and may be fixed to the corresponding plate 110 at a second opposite end thereof. The connecting members 130 may be disposed between the plates 110 and members connected to the plates 110 to allow movement of the plates 110. In other words, the plates 110 may be indirectly connected to the fixed passage walls 23, the first cap housing 22, and the membrane part 10 by the connecting members 130.

The connecting members 130 may include the first connecting members 131 that connect the plates 110 and the first cap housing 22. The connecting members 130 may include the second connecting members 132 that connect the plates 110 and the membrane part 10. The connecting members 130 may include third connecting members 133 that connect the plates 110 and the fixed passage walls 23.

In general, considering a pressure drop based on a flow of air supplied into the humidifier by the air compressor, the pressure inside the humidifier may decrease in the order of the supply air inflow passage 24 of the first cap 20, the second cap 30, and the membrane part 10. In other words, the pressure $P_{IN}$ of supply air flowing into the supply air inflow passage 24 may be greater than the pressure $P_{EX}$ of exhaust air flowing into the inner space 22s of the first cap housing 22. Accordingly, the elastic members 120 may elastically support the plates 110 toward the center of the supply air inflow passage 24. The plates 110 may be rotated in the inward or outward direction by a difference between a force exerted on an inner surface of the plates 110 by the supply air and a force exerted on an outer surface of the plates 110 by the exhaust air.

Figure 3:
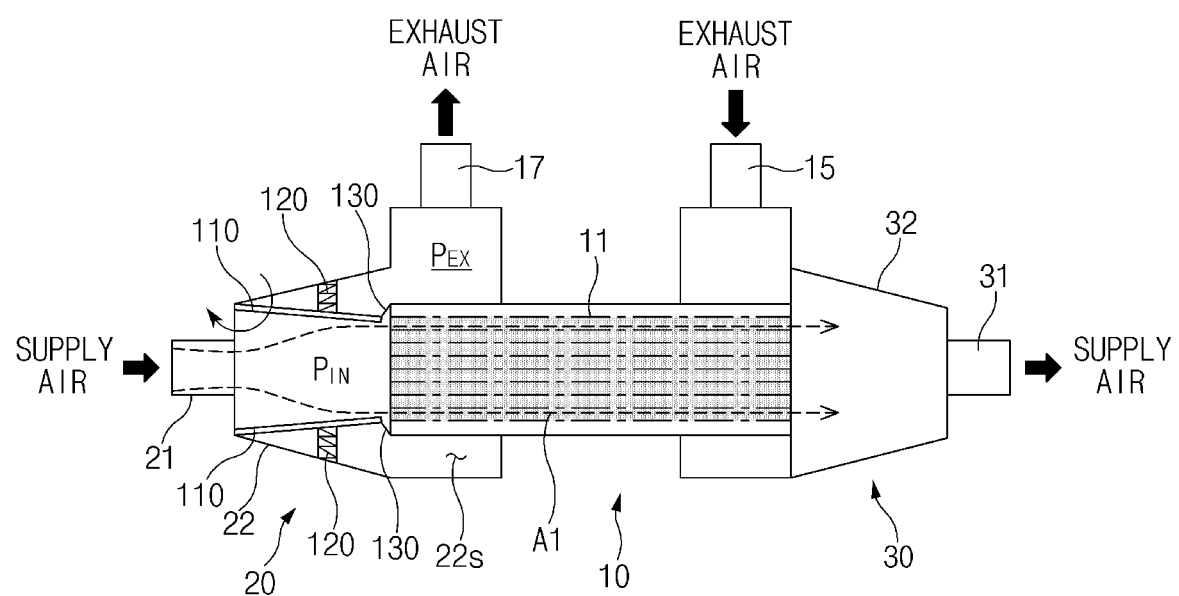
FIGS. 3 and 4 are views illustrating operations of the fuel cell humidifier of FIG. 1 according to an exemplary embodiment of the present disclosure.
Figure 4:
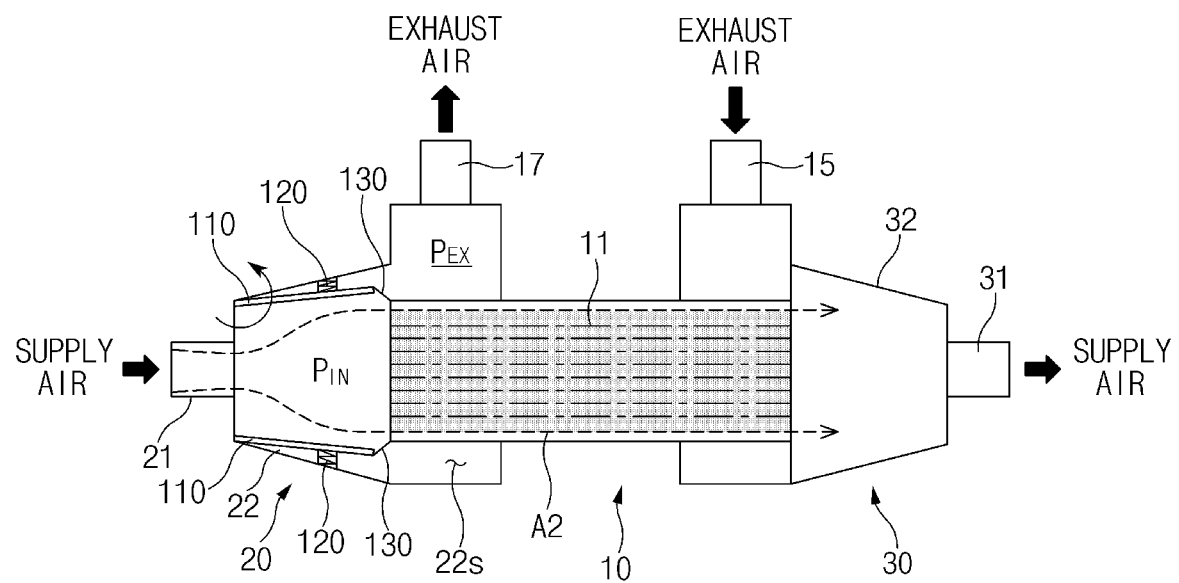

FIGS. 3 and 4 are views illustrating operations of the fuel cell humidifier of FIG. 1. FIG. 3 is a view illustrating a case where the fuel cell system is in a low power output condition. When the fuel cell system is in the low power output condition, the pressure of supply air supplied into the fuel cell stack decreases. Additionally, the pressure $P_{IN}$ of supply air inside the supply air inflow passage 24 and the pressure $P_{EX}$ of exhaust air inside the first cap housing 22 may also decrease.

Further, main forces exerted on the plates 110 may include a force exerted on the insides of the plates 110 by the pressure $P_{IN}$ of the supply air, a force exerted on the outsides of the plates 110 by the pressure $P_{EX}$ of the exhaust air, and an elastic force exerted on the plates 110 by the elastic members 120. The elastic force accounts for a greater portion of the entire resultant force when the fuel cell system is in the low power output condition. Accordingly, the plates 110 may be rotated in the inward direction toward the center of the supply air inflow passage 24 by the elastic force of the elastic members 120.

When the plates 110 are rotated inward toward the center of the supply air inflow passage 24, the cross-sectional area of the first end portion of the supply air inflow passage 24 that is adjacent to the membrane part 10 may decrease. The supply air may flow into the membrane part 10 through the narrow portion of the supply air inflow passage 24. At this time, the supply air may flow into a portion of the entire humidifying area of the membrane part 10. The humidifying area of the membrane part 10 into which the supply air flows may be referred to as a first effective area A1. The first effective area A1 may be represented as shown in FIG. 3.

When the supply air flows into only a portion of the entire humidifying area of the membrane part 10, the supply air may be less humidified while passing through the membrane part 10 than when the supply air flows into the entire humidifying area of the membrane part 10. As a result, the humidifying performance of the humidifier may be actively reduced when the fuel cell system is in the low power output condition.

FIG. 4 is a view illustrating a case where the fuel cell system is in a high power output condition. When the fuel cell system is in the high power output condition, the pressure of supply air supplied into the fuel cell stack may increase. Additionally, the pressure $P_{IN}$ of supply air inside the supply air inflow passage 24 and the pressure $P_{EX}$ of exhaust air inside the first cap housing 22 may increase.

Additionally, main forces exerted on the plates 110 may include a force exerted on the insides of the plates 110 by the pressure $P_{IN}$ of the supply air, a force exerted on the outsides of the plates 110 by the pressure $P_{EX}$ of the exhaust air, and an elastic force exerted on the plates 110 by the elastic members 120. The elastic force accounts for a smaller portion of the entire resultant force when the fuel cell system is in the high power output condition.

In general, considering a pressure drop based on a flow of air supplied into the humidifier by the air compressor, the pressure inside the humidifier may decrease in the order of the supply air inflow passage 24 of the first cap 20, the second cap 30, and the membrane part 10. In other words, the pressure $P_{IN}$ of the supply air flowing into the supply air inflow passage 24 may be greater than the pressure $P_{EX}$ of the exhaust air flowing into the inner space 22s of the first cap housing 22. Accordingly, the plates 110 may be rotated outward from the center of the supply air inflow passage 24 by a difference between the force exerted on the insides of the plates 110 by the supply air and the force exerted on the outsides of the plates 110 by the exhaust air.

When the plates 110 are rotated outward from the center of the supply air inflow passage 24, the cross-sectional area of the first end portion of the supply air inflow passage 24 that is adjacent to the membrane part 10 may increase. The supply air may flow into the membrane part 10 through a wide portion of the supply air inflow passage 24. At this time, the supply air may flow into the entire humidifying area of the membrane part 10. The humidifying area of the membrane part 10 into which the supply air flows may be referred to as a second effective area A2. The second effective area A2 may be represented as in FIG. 4.

Comparing FIG. 3 and FIG. 4, the figures show that the second effective area A2 is wider than the first effective area A1. As a result, the humidifying performance of the humidifier may be actively increased when the fuel cell system is in the high power output condition. Hereinabove, the high and low power output conditions have been compared and described. However, since the air pressure inside the humidifier varies with a change in the power output condition of the fuel cell system, the humidifying performance of the humidifier may also vary accordingly.

The above-configured fuel cell humidifier may actively adjust the humidifying performance thereof based on operating conditions of the fuel cell system, and in particular, may adjust the humidifying performance thereof with a mechanical structure even though separate power is not supplied. Accordingly, the efficiency of the fuel cell stack may be increased by reducing drying or flooding that occurs in the fuel cell stack.

Figure 5:
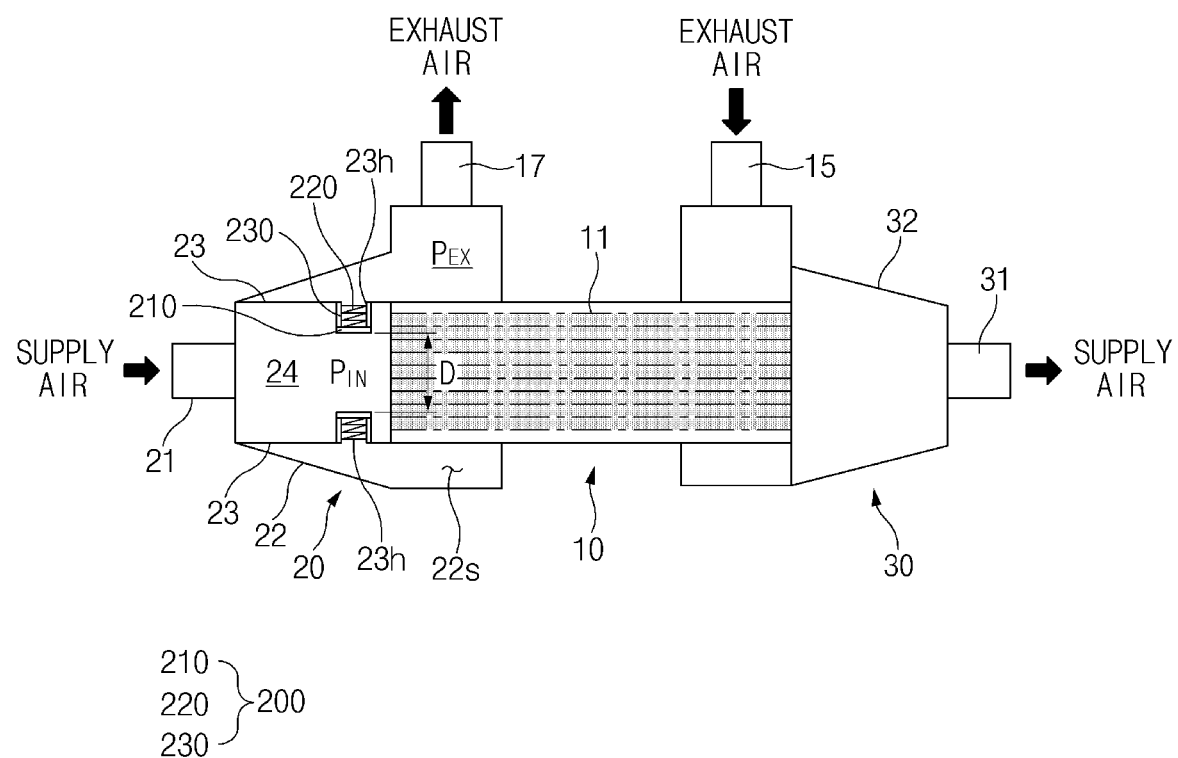
FIG. 5 is a schematic view illustrating a humidifier for a fuel cell according to another embodiment of the present disclosure.

FIG. 5 is a schematic view illustrating a humidifier for a fuel cell according to another exemplary embodiment of the present disclosure. Referring to FIG. 5, a variable member 200 in this exemplary embodiment may be installed in the supply air inflow passage 24. The variable member 200 may include head plates 210, inner elastic members 220, and stretchy members 230.

Particularly, the head plates 210 may have a plate shape with a predetermined thickness. The inner elastic members 220 may be installed on inner surfaces of the supply air inflow passage 24 to elastically support the head plates 210. The stretchy members 230 may maintain the air-tightness between the head plates 210 and the supply air inflow passage 24 and may stretch or expand to allow movement of the head plates 210. The head plates 210 and the stretchy members 230 may form inner spaces of the variable member 200 in which the inner elastic members 220 are accommodated.

Additionally, apertures 23 may be formed through portions of the supply air inflow passage 24 where the variable member 200 is installed, and exhaust air may flow into the inner spaces of the variable member 200 through the apertures 23h to press the outsides of the head plates 210. The head plates 210 may be moved in the inward or outward direction by a difference between a force exerted on an inner surface of the head plates 210 by supply air and a force exerted on an outer surface of the head plates 210 by the exhaust air.

The inside of each head plate 210 may be defined as one surface of the head plate 210 that contacts the supply air. The outside of the head plate 210 may be defined as one surface of the head plate 210 supported by the inner elastic member 220 and that contacts the exhaust air. The inward direction may be defined as a direction in which the head plate 210 is directed to the center of the supply air inflow passage 24. The outward direction may be defined as a direction opposite to the inward direction.

Operations of the humidifier according to this exemplary embodiment will be described below with reference to FIG. 5. When the fuel cell system is in a high power output condition, the pressure $P_{IN}$ of the supply air inside the supply air inflow passage 24 may increase, and therefore the head plates 210 may be moved in the outward direction by the difference between the force exerted on the insides of the head plates 210 by the supply air and the force exerted on the outsides of the head plates 210 by the exhaust air.

Furthermore, the distance D between the head plates 210 may be increased, and the cross-sectional area of the flow passage defined by the variable member 200 may be increased. As a result, the effective humidifying area of the membrane part 10 into which the supply air flows may be increased, and therefore the humidifying performance of the humidifier may be increased. Meanwhile, when the fuel cell system is in a low power output condition, the pressure $P_{IN}$ of the supply air inside the supply air inflow passage 24 may decrease, and therefore the head plates 210 may be moved in the inward direction by the difference between the force exerted on the insides of the head plates 210 by the supply air and the force exerted on the outsides of the head plates 210 by the exhaust air.

At this time, the elastic force exerted on the head plates 210 by the inner elastic members 220 accounts for a greater portion of the entire resultant force exerted on the head plates 210. Accordingly, the head plates 210 may be considered to be moved in the inward direction by the elastic force. Furthermore, the distance D between the head plates 210 may be decreased, and the cross-sectional area of the flow passage defined by the variable member 200 may be decreased. As a result, the effective humidifying area of the membrane part 10 into which the supply air flows may be decreased, and therefore the humidifying performance of the humidifier may be decreased.

According to the exemplary embodiments of the present disclosure, at least the following effects are achieved. The variable member may be moved in the inward direction toward the center of the supply air inflow passage or in the outward direction opposite to the inward direction based on the pressure inside the supply air inflow passage to vary the cross-sectional area of at least a portion of the supply air inflow passage, thereby actively adjusting the amount of moisture added by the humidifier even without the supply of separate power. Accordingly, the amount of added moisture may be actively adjusted based on various operating conditions of the fuel cell stack, thereby preventing degradation in the performance of the fuel cell stack or damage to the fuel cell stack due to drying or flooding that occurs in the fuel cell stack.

Effects of the present disclosure are not limited to the aforementioned effects, and any other effects not mentioned herein will be clearly understood from the accompanying claims by those skilled in the art to which the present disclosure pertains. Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A humidifier for a fuel cell, comprising:
a membrane part having a humidifying membrane accommodated therein;
a first cap coupled to a first side of the membrane part and configured to feed supply air into the humidifying membrane;
a second cap coupled to a second side of the membrane part, opposite to the first side of the membrane part, and configured to release humidified supply air introduced from the humidifying membrane;
an exhaust air inlet coupled to one of the first and second sides of the membrane part and configured to inject exhaust air released from a fuel cell stack into the membrane part; and
an exhaust air outlet coupled to one of first and second sides of the membrane part, that is the opposite side to which the exhaust air inlet coupled, and configured to release dehumidified exhaust air passing through the membrane part to an exhaust line,
wherein the first cap includes a supply air inflow passage through which the supply air to be fed into the humidifying membrane flows and a variable member installed in the supply air inflow passage or including at least a portion capable of entering the supply air inflow passage, and
wherein the variable member is moved in an inward direction toward the center of the supply air inflow passage or in an outward direction opposite to the inward direction based on pressure inside the supply air inflow passage to vary a cross-sectional area of at least a portion of the supply air inflow passage.

2. The humidifier of claim 1, wherein the first cap includes:
a first cap housing having an inner space in which the supply air inflow passage and the variable member are accommodated,
wherein the first cap housing communicates with the exhaust air inlet, and the exhaust air flows into the inner space of the first cap housing, and
wherein the variable member is moved in the inward or outward direction by a difference between a force exerted on a first side surface of the variable member by the supply air and a force exerted on a second side surface of the variable member by the exhaust air.

3. The humidifier of claim 2, wherein the variable member includes:
a plate pivotally connected to the first cap housing and that forms a portion of the supply air inflow passage,
wherein the plate has a first end connected to a first side of the first cap housing and a second end that extends toward an entrance of the membrane part, and
wherein the plate is rotated in the inward or outward direction by a difference between a force exerted on an inner surface of the plate by the supply air and a force exerted on an outer surface of the plate by the exhaust air.

4. The humidifier of claim 3, wherein the variable member further includes an elastic member installed in the inner space of the first cap housing to elastically support the plate.

5. The humidifier of claim 3, wherein the variable member further includes a connecting member that is expandable and connected between the plate and a fixed portion of the supply air inflow passage to allow movement of the plate.

6. The humidifier of claim 3, wherein the inner space of the first cap housing becomes gradually wider from the first side of the first cap housing, through which the supply air flows into the first cap housing, to a second side of the first cap housing coupled to the membrane part to allow the plate to rotate in the outward direction by a predetermined angle.

7. The humidifier of claim 3, wherein the first cap housing includes, at the first side thereof, a supply air inlet through which the supply air flows into the first cap housing, and wherein the supply air inflow passage has a greater cross-sectional area than the supply air inlet.

8. The humidifier of claim 3, wherein the plate includes:
a first plate and a second plate,
wherein in the inner space of the first cap housing, a pair of fixed passage walls are fixed to face each other, and the first plate and the second plate are connected to a first side and a second side of the pair of fixed passage walls to face each other, and
wherein the first and second plates are pivotally coupled to the first cap housing, and the pair of fixed passage walls and the first and second plates form the supply air inflow passage together.

9. The humidifier of claim 2, wherein: the variable member is installed in the supply air inflow passage, and includes:
a head plate having an inner surface in contact with the supply air;
an inner elastic member installed on an inner surface of the supply air inflow passage to elastically support the head plate; and
a stretchy member configured to maintain air-tightness between the head plate and the supply air inflow passage and expand to allow movement of the head plate.

10. The humidifier of claim 9, wherein the head plate and the stretchy member form an inner space of the variable member in which the inner elastic member is accommodated.

11. The humidifier of claim 10, further comprising:
an aperture formed through a portion of the supply air inflow passage where the variable member is installed,
wherein the exhaust air flows into the inner space of the variable member through the aperture to press the outside of the head plate.

12. The humidifier of claim 11, wherein the head plate is moved in the inward or outward direction by a difference between a force exerted on the inner surface of the head plate by the supply air and a force exerted on the outer surface of the head plate by the exhaust air.

* * * * *